(No Model.)

C. E. ERVIN & O. E. FRYATT.
WHEEL.

No. 598,366.  Patented Feb. 1, 1898.

WITNESSES:
Franck L. Ouvrand
Jo. L. Coombs

INVENTORS:
Charles E. Ervin and
Oren E. Fryatt,
by Louis Sagger
Attorneys

UNITED STATES PATENT OFFICE.

CHARLES E. ERVIN AND OREN E. FRYATT, OF TERRE HAUTE, INDIANA.

WHEEL.

SPECIFICATION forming part of Letters Patent No. 598,366, dated February 1, 1898.

Application filed August 9, 1897. Serial No. 647,594. (No model.)

*To all whom it may concern:*

Be it known that we, CHARLES E. ERVIN and OREN E. FRYATT, citizens of the United States, and residents of Terre Haute, in the county of Vigo and State of Indiana, have invented certain new and useful Improvements in Wheels; and we do hereby declare that the following is a full, clear, and exact description of the invention, which will enable others skilled in the art to which it appertains to make and use the same, reference being had to the accompanying drawings, which form a part of this specification.

Our invention relates to improvements in wheels which are provided with pneumatic tires and is more especially designed for bicycle-wheels.

In the ordinary bicycle-wheels provided with pneumatic tires there is great liability of the tires being worn or abraded by reason of the friction between the same and the edges of the fellies, which frequently results in the tire being punctured.

The object of our invention is to provide the fellies of a wheel with an elastic cushion, against which the pneumatic tire will rest or abut, so that when in use the wear or strain of the tire will come upon said cushion instead of the sharp solid edges of the fellies, as usual.

The invention consists, essentially, in the combination, in a wheel, of the simicircular fellies, provided with grooves at the edges thereof, and the elastic cushions seated in said grooves, as hereinafter fully described and claimed.

Figure 1:
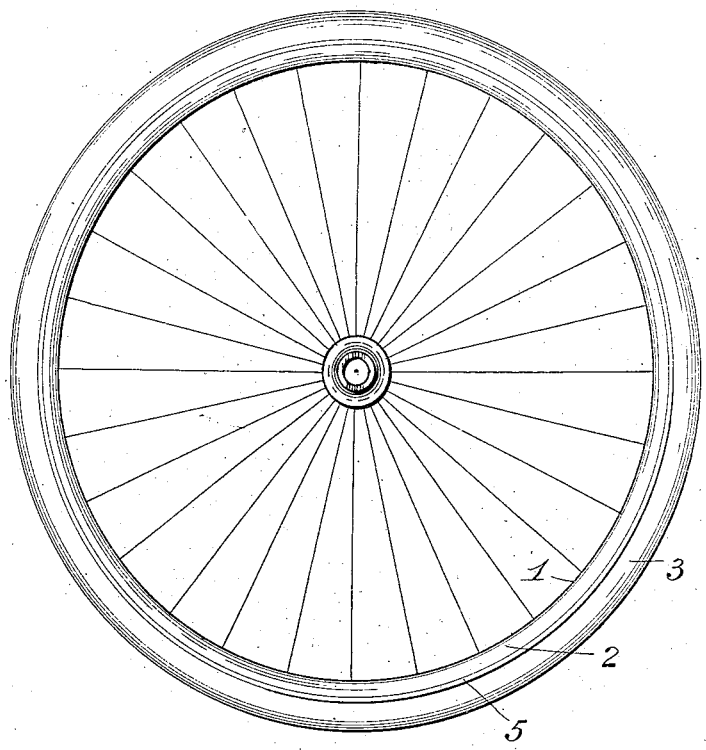
Figure 2:
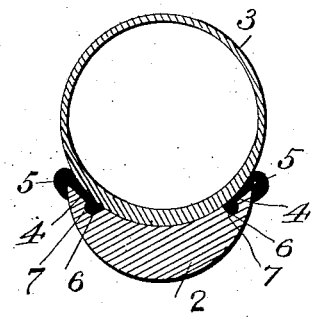

In the accompanying drawings, Figure 1 is a side elevation of a wheel constructed in accordance with our invention. Fig. 2 is a detail transverse section of the same.

In the said drawings the reference-numeral 1 designates a wheel of any ordinary or suitable construction provided with the usual semicircular or concave fellies 2 and a pneumatic tire 3. The said fellies at their edges are cut away or formed with grooves 4, extending throughout their entire length, so that when the parts of the wheel are assembled there will be a continuous groove formed around the rim of the wheel at each side thereof. At the inner edges of said cut-away portions the fellies are formed with half-round grooves 7, also extending throughout the length of the fellies. The numeral 5 designates elastic cushions, of rubber or other suitable material, formed with half-round or semicylindrical flanges or ribs 6 at the inner ends, engaging with the grooves 7, while at the outer ends they are formed with flanges 8, which overlap the edges of the fellies.

From the above it will be seen that when pressure is brought to bear upon the tire, when in use, instead of the latter engaging with the edges of the fellies, as usual, it will bear against the cushions seated in the grooves of the fellies, which will give or yield and thus prevent wear or abrasion of the tire, which in the ordinary wheels frequently results in puncturing or otherwise injuring the same.

We do not wish to confine ourselves to bicycle-wheels, as our invention will be found applicable to all wheels which are provided with pneumatic tires.

Having thus fully described our invention, what we claim is—

In a wheel, the combination with the tire, the fellies cut away at the edges, and formed with half-round grooves at the inner edges of said cut-away portions, of the elastic cushions interposed between the fellies, and the tire, formed at the inner ends with semicylindrical flanges fitting in said grooves and at the outer ends with flanges overlapping the edges of the fellies, substantially as described.

In testimony that we claim the foregoing as our own we have hereunto affixed our signatures in presence of two witnesses.

CHARLES E. ERVIN.
OREN E. FRYATT.

Witnesses:
ANDREW GRIMES,
JOHN MCMINN.